Oct. 14, 1941.　　　C. H. SCOTT　　　2,259,231
CLASSIFIER
Filed April 6, 1940　　　4 Sheets-Sheet 1

INVENTOR
CHARLES H. SCOTT,
BY
ATTORNEY.

Oct. 14, 1941.   C. H. SCOTT   2,259,231
CLASSIFIER
Filed April 6, 1940    4 Sheets-Sheet 2

INVENTOR.
CHARLES H. SCOTT,
BY
ATTORNEY.

Oct. 14, 1941.  C. H. SCOTT  2,259,231
CLASSIFIER
Filed April 6, 1940  4 Sheets-Sheet 3

INVENTOR
CHARLES H. SCOTT,
BY Arthur Middleton
ATTORNEY.

Oct. 14, 1941.  C. H. SCOTT  2,259,231
CLASSIFIER
Filed April 6, 1940  4 Sheets-Sheet 4
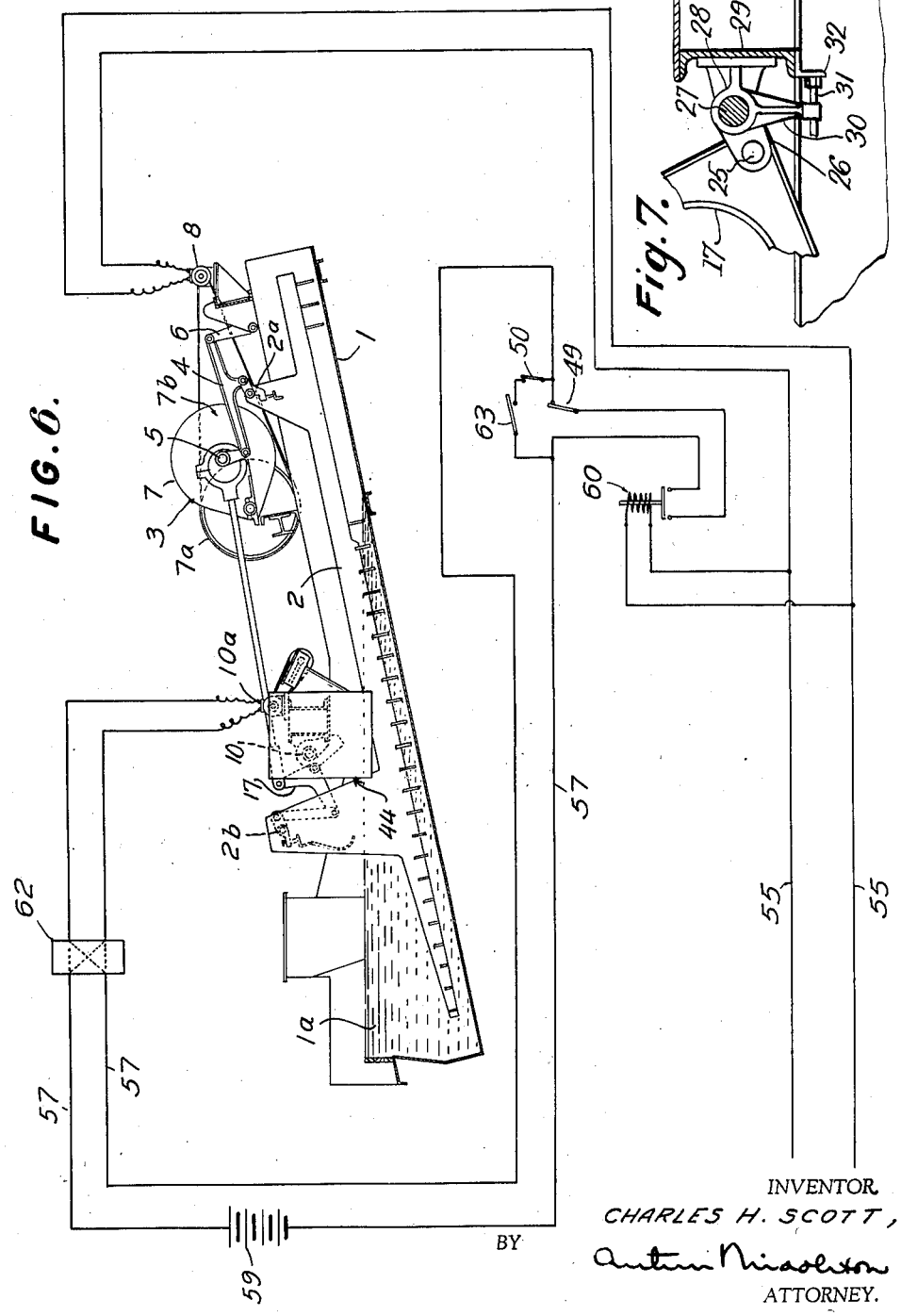
INVENTOR
CHARLES H. SCOTT,
BY
ATTORNEY.

Patented Oct. 14, 1941

2,259,231

UNITED STATES PATENT OFFICE 2,259,231

CLASSIFIER

Charles H. Scott, Westport, Conn., assignor to The Dorr Company, Inc., New York, N. Y., a corporation of Delaware Application April 6, 1940, Serial No. 328,227

8 Claims. (Cl. 198—232)

This invention relates to classifiers, in which coarse solids are brought to emergence and are separated from an agitated pulp bath, while suspended fines are allowed to overflow.

The classifier herein more specifically considered is of the Dorr-type having motor driven raking mechanism, and as such the classifier has a reciprocating partly submerged bladed or rake structure for agitating the pulp bath in the classifier tank in order to keep the finer sizes in suspension, as well as to rake the heavy settled particles upwardly along the sloping bottom of the tank to a point of emergence, the fines in suspension being permitted to overflow the deep end of the tank.

Trouble has been experienced in cases of unexpected stoppage of the classifier when the submerged portion of the rake structure gets buried and the blades thereof stuck in a load of sands that settle from the classifier bath, a condition which makes the immediate restarting of the classifier all but impossible.

It has been known to meet this emergency by providing hand-operated mechanism for the purpose of raising the submerged lower portion of the rake structure before it gets tightly packed in the sands. But, suppose a whole battery of classifiers has stopped at once, for instance through failure of the power supply, and the hand-operating mechanism may not have been actuated before the sands have packed themselves down on the rake, or worse, the rakes through inadvertence may not have been lifted when the power is turned on again and the classifier restarted. Again trouble will ensue.

Hence it is one object of the invention to provide a rake lifting mechanism that will automatically respond in case of stoppage of the classifier due to failure of the power line.

Other objects are to provide motor actuated rake lifting means that are compact, simple, and efficient.

According to one feature a suitable rake lifting mechanism is driven by an auxiliary motor actuated by a source of power, for instance a storage battery, which is independent of the main power line that normally feeds the classifier motor. The main power circuit is coupled with the auxiliary circuit in such a manner, that the auxiliary motor for rake lifting is automatically started when the main power line fails. More specifically, the two circuits are directly associated with one another by way of relay or solenoid means effective to start the rake lifting motor in response to power failure.

Features with respect to the rake lifting mechanism itself are based upon providing a shaft transversely of the classifier tank, the rotation of which raises or lowers the respective suspension point of the rake structure. A gear sector is loose on the shaft and has lost motion connection with a lug or the like that in turn is fixed upon the shaft. Suitable motor driven gearing rotates the gear sector in one direction so as to engage the lug on the shaft to raise the rake. When rotated in the opposite direction the gear sector lowers the rake to a point determined by some suitable abutment means which become effective independent of any possible continued movement of the gear sector due to the lost motion connection thereof with the shaft.

According to another, more specific feature, there is provided a gear assembly to drive the gear sector, with the parts of the assembly combined in a common structure or casing which in turn is mountable and supported by the classifier tank.

According to another feature the movement of the gear sector is utilized to actuate limit switches, to limit downward or upward operation respectively of the rake lifting mechanism.

The invention possesses other objects and features of advantage, some of which, with the foregoing, will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 6 is a wiring diagram showing the interrelation of the respective motor circuits involved in the automatic operation of the rake lifting device, and also showing a diagrammatic total view of the classifier.

Fig. 7 is a section along the line 7—7 in Fig. 1, showing the details of a stop mechanism determining the lower limit position of the rake structure.

Figure 1:
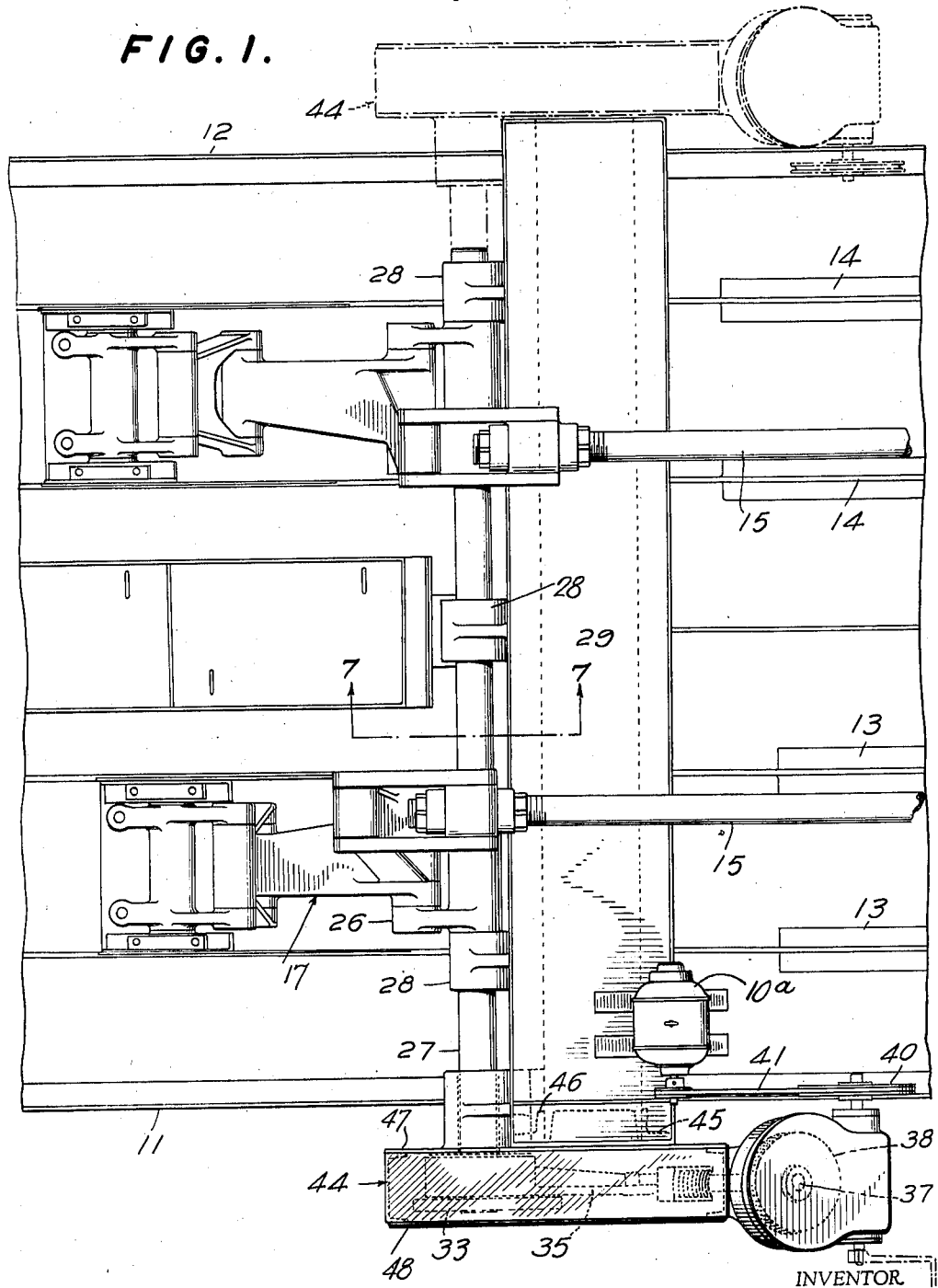
Fig. 1 is a plan view upon a pertinent part of the classifier to show where the rake lifting mechanism is attached, namely, at the lower rake suspension point.

To illustrate the present invention there is shown in Fig. 6 by way of example a classifier tank 1 with the pulp bath 1a, and having a rake member 2 suspended from its operating mechanism by way of an upper suspension point 2a and a lower suspension point 2b, the lower end portion of the rake being submerged in the pulp bath 1a. By way of point 2a the upper end portion of the rake member is given a cyclic positive head motion as by means of an otherwise known mechanism 3, the rake member being suspended from an intermediate point of an actuating bar 4, one end of which bar is driven by a crankshaft 5, the other end being supported by and pivoted to a rocking member 6. Drive means for this head motion mechanism comprise gearing 7, pulley 7a, drive belt 7b, and a motor 8 herein to be termed the classifier motor inasmuch as it drives the rake member in the continuous operation of the machine, and to be distinguished from the rake lifting motor hereinafter mentioned.

Controlled from the shaft 5 of the head motion mechanism the lower rake suspension point is given an up and down component movement which is synchronized and homologous to the head motion, so that the lower end portion of the rake member will move in substantial synchronism with the cyclic motion as definer by the head motion mechanism, this synchronized movement being transmitted to the lower suspension point by way of a reach rod 15 and a bell crank 17.

With respect to the invention proper it is to be noted that the pivotal center of the bell crank 17 is capable of being raised or lowered by means of mechanism diagrammatically shown at 10 (Fig. 6) and driven by a motor 10a herein to be termed the auxiliary motor, or the rake lifting motor although it serves to raise as well as to lower the submerged end portion of the rake member. The parts and function of this mechanism, and an electric wiring system functionally interconnecting the classifier motor 8 and the rake lifting motor 10a, will herein be described.

Figure 2:
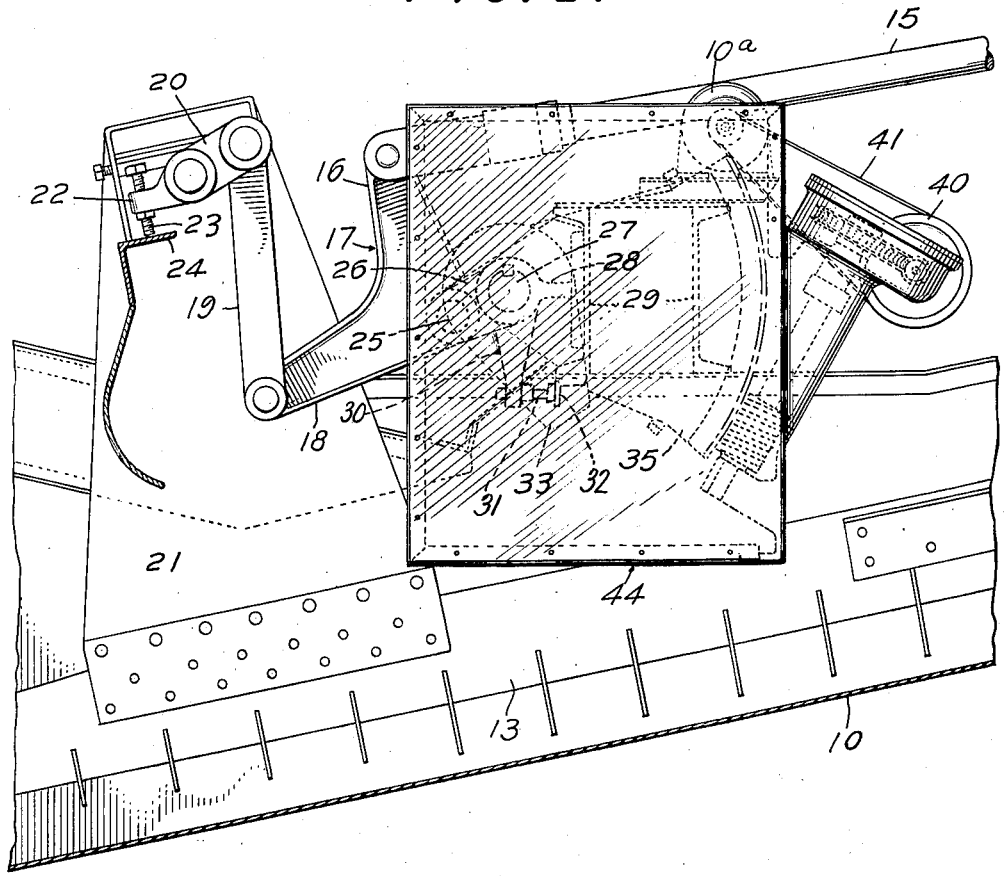
Fig. 2 is a part sectional side view of what is shown in Fig. 1.
Figure 5:
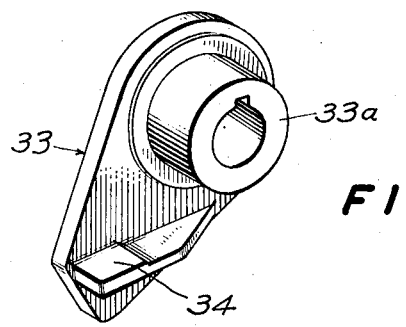
Fig. 5 is an enlarged perspective view of that part of the lost motion connection which is fixed to the rake lifting shaft.

Hence, Figs. 1 and 2 show merely the pertinent portion of such a classifier, namely, the portion and mechanism that serves to illustrate the rake lifting mechanism as applied to the lower rake suspension point of the classifier. By way of example there is herein shown a twin rake arrangement, that is to say, a pair of rake structures 13 and 14 operating side by side upon the tank bottom. Inasmuch as the drive connections have both rake structures and are identical, only the one for rake 13 need herein be specifically described and referred to. It comprises the reciprocating reach rod 15 controlled from the head motion mechanism at that end of the classifier which is not shown in Fig. 1 although shown in Fig. 5, and pivoted to the upwardly extending arm 16 of the bell crank 17 (see Fig. 2). The other arm 18 of the bell crank 17 has pivoted thereto a rocker link 19. This rocker link extends upwardly and has its upper end portion pivotally connected with another and shorter link 20 which might be called a compensation link in that it is in turn pivoted to a rake hanger plate 21 which is fixed to the rake structure 13. The compensation link 20 has a free end portion 22 provided with an adjustable bolt or set screw 23 which, by reason of the weight of the rake structure is caused to engage upon an abutment 24 fixed with respect to the hanger plate 21. The compensation link 20 thus being interposed between the rocker link 19 and the rake hanger plate 21, permits the rake structure to yield upwardly when an obstruction is encountered in the tank that interferes with its normal raking movement.

The bell crank 17 has its pivotal center at 25, namely, in that it is swingably mounted upon an arm 26 fixed upon a rocker shaft 27. The rotational movement of the shaft 27 in the one or the other direction will accordingly raise or lower the pivotal center 25 of the bell crank 17, and thereby raise or lower the submerged end portion of the rake structure 13. The shaft 27 is mounted in journals 28 which in turn are fastened to a beam or beam construction 29 which is mounted upon and extends transversely of a classifier tank.

The shaft 27 also has fixed thereto a downwardly extending arm 30 rigid with arm 26 and provided with an adjustable bolt or set screw 31 and which is caused by the weight of the rake structure to engage an abutment member 32 shown to be fixed to the beam 29. This abutment determines the normal raking level of the rake structure with respect to the tank bottom.

The beam 29 is furthermore shown to support the mechanism which actuates the rocker shaft 27 for the purpose of rake lifting or lowering. This mechanism is disposed at one side of the classifier tank and attaches to one free end of the shaft 27 and of the beam 29 respectively. At its end the shaft 27 carries fixed an arm 33 (note also the detail view thereof in Fig. 5) having a hub portion 33a, the arm itself being provided with a lug portion 34 to provide lost motion driving connection with a gear sector 35 which latter is loose with respect to shaft 27 and swingable upon the hub portion 33a of the arm 33.

A worm 36 meshes with gear sector 35 and operates by rotation of the worm shaft 37 which in turn is driven by a worm drive comprising a worm wheel 38 fixed to the worm shaft 37 and driven by a worm shaft 39 which is provided at one end with a pulley 40 driven by a belt 41 from rake lifting motor 10a mounted on the beam 29. The worm 36 on the one hand and the worm drive including worm wheel 38 and worm shaft 39 on the other hand are combined in a unitary bearing construction or housing which is shown to have the form of a casting 43 and which in turn forms part of a box-like frame construction or casing 44. It is noted that this gear casing 44 is fastened to and supported by the beam 29 as by means of clips 45 and 46 (see Fig. 1). The frame construction or gear casing 44 has a rear wall 47 and a removable front cover 38, and it houses the gear sector 35 and the arm 33.

The movement of the gear sector 35 is utilized to determine automatic stopping points of the mechanism in the course of raising and lowering the rake structure. To this end limit switches are provided to be actuated by the gear sector 35, and the switches too are provided within the gear casing 44. Hence there is provided one limit switch 49 which stops the rake lifting motor 10a to terminate the lifting movement of the submerged part of the rake structure, and another limit switch 50 to stop the motor 10a after the rake has been lowered and reached its normal operating level as defined by the abutment means 31, 32. Adjustable contact or actuating members 51 and 52 are provided on the gear sector 35 for properly timing the respective limit switches 49 and 50.

In the wiring diagram of Fig. 6, the main power connection is shown at 55 to supply the classifier motor 8 normally driving the rake actuating mechanism. A separate independent power circuit is shown at 57 to supply the auxiliary or rake lifting motor 10a, and this circuit is shown to include a battery 59 as an independent available source of power. The main supply circuit 55 and the auxiliary circuit 57 are functionally coupled by way of a solenoid controlled switch device 60 which opens or closes the auxiliary independent circuit 57 depending upon whether or not the solenoid of the switch device 60 is energized by the main current in circuit 55. The arrangement is such that when the main power in circuit 55 fails, the solenoid controlled switch 60 will close and thereby start the rake lifting motor 10a, causing the rake structure to be raised until the limit switch 49 in the auxiliary circuit 57 is opened, (the limit switch 49 also being shown in Fig. 3).

At 62 is indicated a reversing switch for the rake lifting motor 10a. A push button switch 63 in the auxiliary circuit permits to start the motor 10 for lowering the rake structure, and the operation may again be stopped by a limit switch 50 shown also in the gear casing 44 in Fig. 3.

*Operation*

Figure 3:
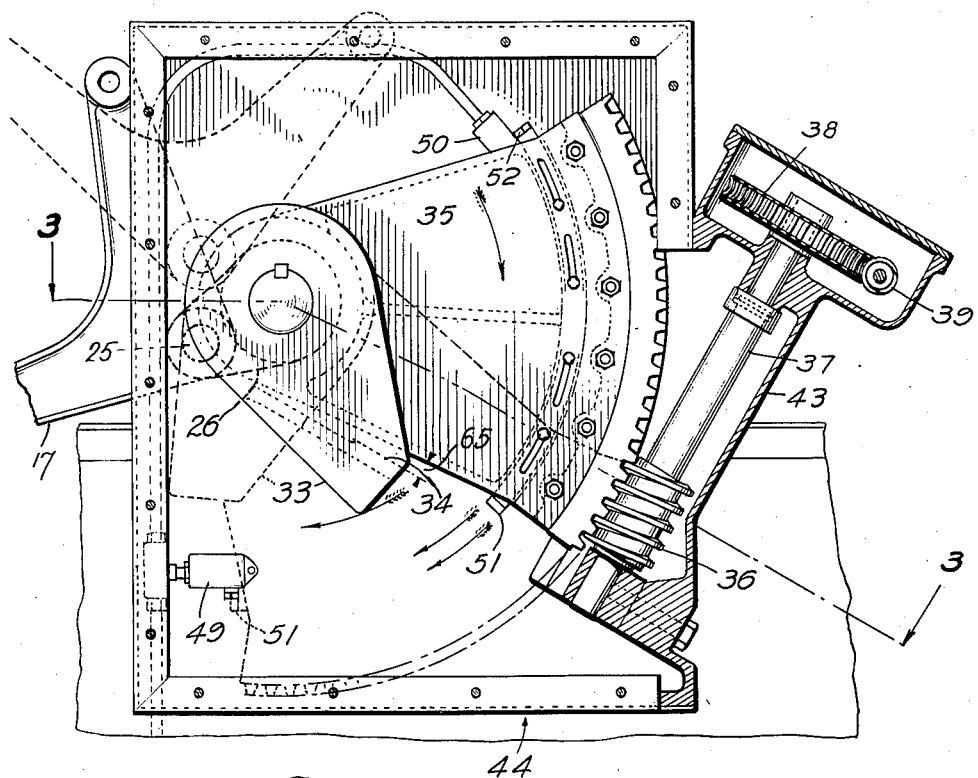
Fig. 3 is an enlarged side view of the drive gearing for the rake lifting mechanism, with casing cover removed to show drive elements and their lost motion connection with the rake lifting shaft.
Figure 4:
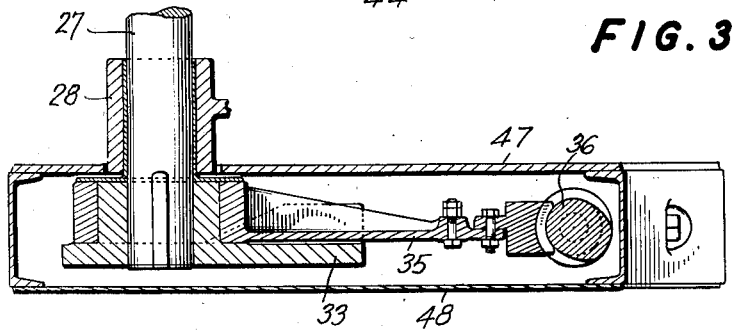
Fig. 4 is a cross-section along line 3—3 of Fig. 3.

When the classifier is operating normally, the rake lifting mechanism is idle with parts in position as shown in Figs. 2 and 3, and with the lost motion clearance 65 between the gear sector 35 and the lug portion 34 of arm 33, as indicated in Fig. 3. That is to say, the main power in circuit 55 is alive and the classifier motor 8 is running. The solenoid in the switch device 60 then is and remains energized as long as this running condition maintains, and the switch 60 is kept open. But if the main power fails, the solenoid of switch 60 will be de-energized, permitting the switch to close the auxiliary independent circuit 57. This starts the auxiliary motor 10a which rotates the pulley 40 by way of the belt 41, and consequently actuates the worm drive 38, 39, to rotate the worm 36. This starts the gear sector 35, causing it first to take up the slack or lost motion clearance 65 before engaging the lug portion 34 to begin rotating the rocker shaft 27 and thereby raising the pivotal center 25 of the bell crank 17, and consequently raising the submerged end portion of the rake structure. Eventually when the gear sector 35 will have reached the position shown in dotted lines (in Fig. 3), the contact member 51 on the gear sector 35 opens the limit switch 49 which stops the lifting movement of the submerged portion of the rake structure, leaving it in a position where it is not liable to be unduly buried under the solids or sands that settle in the classifier bath upon stoppage of the classifier operation.

As the power to the classifier motor 8 is restored, the solenoid controlled switch device 60 will be opened, due to re-energization of the solenoid, and the rake actuating mechanism will be functioning again, although with the rake structure working in its raised position. Then, the reversing switch 62 is thrown to condition the rake lifting motor 10a for reversal of rotation, whereupon the push button switch 63 may be closed to start the rake structure on its downward or lowering movement, the weight of the rake structure being sufficient to maintain contact between all members of the lifting mechanism until the lowering movement is stopped by the abutment members 31 and 32. The mechanism is allowed to continue somewhat further to make sure that the abutment 32 has been reached, and that the lug portion 34 of arm 33 has been released by the gear sector 35.

At this time the limit switch 50 in the gear casing 44 is opened by the contact member 52 on the gear sector 35, so that the rake lifting motor 58 is stopped, as the gear sector 35 substantially resumes its initial position shown in Fig. 3.

I claim:

1. In combination with a classifier having a reciprocating rake structure operating upon a sloping deck constituting the bottom of the classifier tank, and which rake structure is partly submerged in the classifier bath, and further having a motor driven actuating mechanism for the rake structure, to support the same by way of a pair of longitudinally spaced suspension points, a motor driven rake lifting mechanism normally idle when the classifier is operating, and control means effective to start the rake lifting motor in response to power failure stopping the classifier motor.

2. Apparatus according to claim 1, in which the control means comprise a solenoid normally energized by the classifier motor circuit, and effective to close the rake lifting motor circuit upon de-energization of the solenoid, to cause lifting of the rake.

3. Apparatus according to claim 1, in which the rake lifting mechanism comprises a gear sector which when rotated in one direction raises the submerged end portion of the rake structure, with the addition of a limit switch actuated by the gear sector to stop the rake lifting motor to determine the end of the lifting movement of the rake structure.

4. Apparatus according to claim 1, in which the rake lifting mechanism comprises a gear sector, the movement in one direction of which raises the submerged end portion of the rake structure, with the addition of a limit switch controlled by the movement of the gear sector to stop the rake lifting motor at the end of the rake lifting movement, and an adjustable contact member on the sector to engage the limit switch.

5. Apparatus according to claim 1, in which the rake lifting mechanism comprises a shaft extending transversely of the classifier tank, the rotation of which shaft raises the submerged end portion of the rake structure, a gear sector loose on the shaft and adapted to engage said lug portion to rotate the shaft for raising the rake structure, and drive gear means for the gear sector.

6. Apparatus according to claim 1, in which the rake lifting mechanism comprises a shaft extending transversely of the classifier tank the rotation of which shaft raises the submerged end portion of the rake structure, a gear sector on the shaft and having lost motion connection therewith, and means for driving said gear sector, which comprise a worm to engage said gear sector, a worm drive for directly driving said worm, and a frame outlet for said worm and said worm drive and adapted to be mounted on the classifier tank in operative relationship to said gear sector.

7. For use with a classifier having a reciprocating rake structure operating upon a sloping deck constituting the bottom of the classifier tank, which rake structure is partly submerged in the classifier bath and having a motor driven actuating mechanism for the rake structure, which rake structure is operatively supported by the actuating mechanism by way of a pair of longitudinally spaced suspension points for the rake structure, and having a shaft extending transversely of the classifier tank, the rotation of which shaft in the one or the other direction respectively raises or lowers the submerged end portion of the rake, a rake lifting mechanism disposed at one end of said shaft and comprising a gear sector having lost motion driving connection with said shaft, and adapted for engagement with a worm to drive said gear sector, a worm drive directly connected and unitary with said worm shaft and the frame construction having mounted thereon said worm and said worm drive, which frame construction is adapted to be mounted with respect to the classifier tank in a manner to bring the worm into mesh with said gear sector.

8. For use with a classifier having a reciprocating rake structure upon a sloping deck constituting the bottom of the classifier tank, which rake structure is partly submerged in the classifier bath, and having an actuating mechanism for the rake structure, which rake structure is operatively supported by the actuating mechanism by way of a pair of longitudinally spaced suspension points, a shaft extending transversely of the classifier tank, the rotation of which shaft in the one or the other direction respectively raises or lowers the submerged end portion of the rake structure, a beam construction extending transversely of and mounted upon the tank, for operatively supporting said shaft and further having abutment means on said beam construction to define the normal operating level of the rake structure with respect to the deck; a rake lifting mechanism disposed at one end of said shaft and of said beam construction, and comprising a gear sector having lost motion driving connection with said shaft, drive gear means for said gear sector, a casing containing and supporting said drive gear means and in turn adapted to be mounted and supported upon said beam construction and a motor also supported upon said beam construction to actuate said drive gear.

CHARLES H. SCOTT.